United States Patent [19]

Martini

[11] 4,415,165
[45] Nov. 15, 1983

[54] INTEGRAL ELASTOMERIC/GRAPHITE DYNAMIC FACE SEAL

[75] Inventor: Leonard J. Martini, San Diego, Calif.

[73] Assignee: The United States of America as represented by the Secretary of the Navy, Washington, D.C.

[21] Appl. No.: 446,294

[22] Filed: Dec. 2, 1982

[51] Int. Cl.³ .......................... F16J 15/34; F16J 15/40
[52] U.S. Cl. ........................................ 277/27; 277/65; 277/81 R
[58] Field of Search ...................... 277/3, 27, 65, 81 R

[56] References Cited

U.S. PATENT DOCUMENTS

| | | | |
|---|---|---|---|
| 3,014,742 | 12/1961 | Mayer | 286/11.15 |
| 3,090,627 | 5/1963 | Tankus | 277/85 |
| 3,101,200 | 8/1963 | Tracy | 277/93 |
| 3,123,364 | 3/1964 | Ennis | 277/1 |
| 3,155,393 | 11/1964 | Hummer | 277/74 |
| 3,447,809 | 6/1969 | Marruso et al. | 277/27 |
| 3,467,396 | 9/1969 | Hershey | 277/65 |
| 3,469,851 | 9/1969 | Enemark | 277/85 |
| 3,479,040 | 11/1969 | Tracy | 277/81 R |
| 3,551,067 | 12/1970 | Wissman | 415/134 |
| 3,552,752 | 1/1971 | Lojkutz | 277/40 |
| 3,652,183 | 3/1972 | Pottharst, Jr. | 415/170 |
| 3,770,179 | 11/1973 | McHugh | 277/65 |
| 4,174,844 | 11/1979 | Zobens | 277/85 |
| 4,299,398 | 11/1981 | Wahl | 277/27 |
| 4,381,867 | 5/1983 | Ohgoshi | 277/27 |

Primary Examiner—Robert I. Smith

Attorney, Agent, or Firm—Robert F. Beers; Ervin F. Johnston; Edmund W. Rusche, Jr.

[57] ABSTRACT

A shaft seal is presented which combines the attributes of the low pressure sealing of an O-ring and the high pressure sealing of a carbon face seal. This invention provides a dynamic shaft seal with the advantage of a very reliable, positive elastomeric O-ring seal for low pressure sealing and the advantage of a reliable graphite face seal for high pressure sealing incorporated into an integral configuration. This integral configuration allows a smooth transition between the low pressure O-ring seal and the high pressure carbon face seal without leakage. Springs are designed to provide the correct preload compression on the dynamic O-ring seal and the forces required such that the transition operation occurs at the proper differential pressure.

Mechanically, a rotating shaft within an aperture in a pressure housing wall is fitted with a sleeve containing a carbon face seal that mates against the face of an elastomeric/graphite-interface seal. The carbon face seal components are keyed to rotate with the shaft while the elastomeric/graphite-interface seal is keyed to the aperture and remains fixed in place during the shaft's rotation. The elastomeric/graphite-interface seal also houses an O-ring which provides a dynamic seal for the shaft at low pressure. Actuation of either the high pressure face type seal or the low pressure O-ring seal is adjustably controlled by compression springs in the mechanism.

18 Claims, 8 Drawing Figures

INTEGRAL ELASTOMERIC/GRAPHITE DYNAMIC FACE SEAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Face type rotary mechanical seals are used extensively for high pressure dynamic shaft seals. Materials used for face seals include graphite or carbon. The sealing efficiency of these seals increases as the pressure differential across the seal increases; the greater the pressure, the better the seal. However, carbon face seals begin to fail at low pressures. They need a guaranteed minimum pressure to maintain a positive seal at a given shaft speed.

Other shaft sealing techniques include use of O-ring seals. O-ring seals are generally limited by excessive pressures and shaft speeds. They have a tendency to fail at high pressures and high shaft speeds. However, they are very reliable at low pressures and low shaft speeds.

SUMMARY OF THE INVENTION

The invention presented herein comprises a combination of a face-type rotary mechanical seal with an O-ring seal to create a shaft seal which resists leakage at both high and low pressure differentials. This invention is referred to as an "Integral Elastomeric/Graphite Face Seal."

Basically, a shaft penetrating through an aperture in a pressure housing wall is sealed by the combination of the face-type rotary seal and an O-ring seal. The face-type seal consists of a carbon face seal keyed to a sleeve mounted on the shaft. The sleeve is keyed to rotate with the shaft, but in a manner that the sleeve may slide back and forth along the shaft.

Another sleeve keyed to the aperture in the pressure housing wall contains the elastomeric/graphite-interface seal for the matching surface of the face seal. This other sleeve also has the capability to be slid back and forth along the axis of the shaft and the aperture. Both sleeves are loaded by springs. The springs are selected or preset to allow the face-type rotary sealing surfaces to come in contact at high pressure differentials across the sealing area. During high pressure differentials between the two sides of the pressure housing wall, the face seal on the sleeve keyed to the aperture, i.e., the nonrotating sleeve, is forced against the carbon face seal by the pressure to form a positive seal against leakage of any fluids along the shaft.

At low pressure differentials, the compression springs acting upon the pair of face seal sleeves creates an axial force which causes an O-ring housed in the sleeve keyed to the aperture to make contact with the surface of the rotating shaft. The contact of this O-ring with the rotating shaft creates a positive seal against leakage which is effective at the low pressure differentials or low shaft speeds.

Static O-ring seals are placed between the shaft the shaft and the carbon face seal sleeve and between the aperture wall and the elastomeric/graphite-interface seal sleeve to complete sealing against any fluid leakages.

OBJECTS OF THE INVENTION

An object of this invention is to provide a positive, dynamic low pressure O-ring seal in combination with a high pressure carbon face seal for a rotating shaft.

Another objective is to provide an integral sealing configuration which allows a smooth transition between a low pressure O-ring seal and a high pressure carbon face seal without leakage.

A further object of the invention is to present an elastomeric/graphite-interface seal that can be applied whenever a positive dynamic shaft seal is required for extreme pressure variations and extreme rotational speeds.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
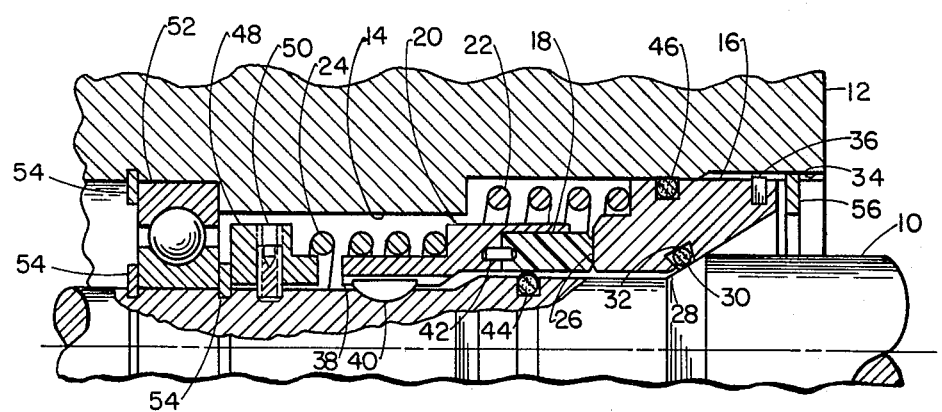
FIG. 1 is a cutaway section showing the shaft in the aperture with the face seal and O-ring seal combination in the position for sealing at a low pressure differential.
Figure 2:
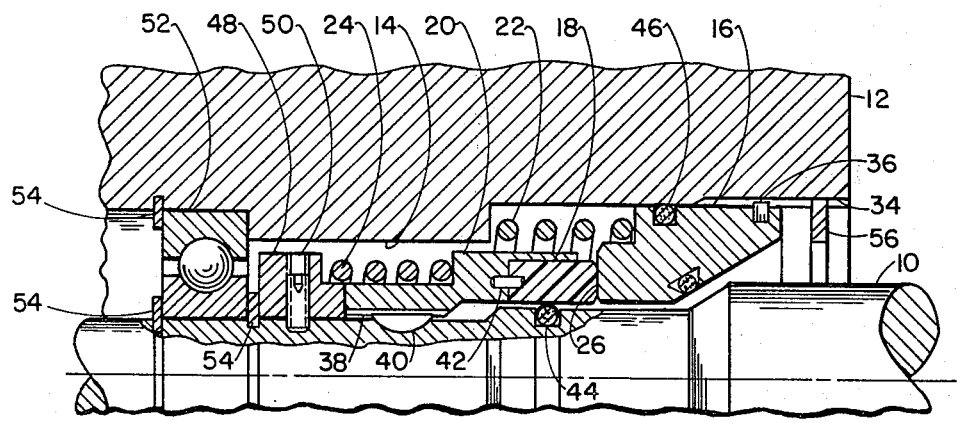
FIG. 2 is a cutaway section showing the shaft in the aperture with the face seal and O-ring seal combination in the position for sealing at a high pressure differential.

FIGS. 1 and 2 present the preferred embodiment in the two principal modes of operation. A rotating shaft 10 is shown supported within an aperture 14 in a pressure housing 12. Support of shaft 10 is by a bearing 52 which is fixed in placed by retaining rings 54. A carbon insert 18, retained by a sleeve 20 and loaded by a spring 24 rotates with shaft 10. The carbon insert 18 is keyed to sleeve 20 by pins 42 while sleeve 20 is keyed to shaft 10 by a key 40 in a key slot 38. A collar 48 is keyed to shaft 10 by several set screws 50 and acts as a support for spring 24 and stop for sleeve 20. An O-ring 44 provides a static positive seal between the carbon insert 18 and shaft 10.

An elastomeric/graphite-interface seal 16, hereafter referred to as the EGI seal, is keyed to housing 12 using several pins 36 and is spring loaded by a spring 22. An O-ring 46 provides a static positive seal between the EGI seal 16 and housing 12.

An O-ring 30 provides the dynamic seal to shaft 10 for low pressure differentials. This O-ring seal is shown in its sealing position in FIG. 1. A groove 32 into which O-ring 30 sits is dovetailed in shape to prevent the O- ring from unseating when EGI seal 16 moves forward along the axis of the shaft under the influence of a high pressure differential. A surface 26 of EGI 16 provides a highly polished face seal to mate with carbon insert 18. A retaining ring 56 can be provided to aid in the assembly procedure until shaft retaining rings 54 are installed. Once retaining rings 54 are installed, retaining ring 56 is not required and may be removed.

FIG. 1 shows the operation of the elastomeric O-ring seal 30 providing a dynamic seal against a sloped surface 28 on rotating shaft 10 at low pressures. The O-ring seal will maintain a positive seal under the preload provided by springs 24 and 22. Several pins 36 around the periphery of EGI seal 16 prevent its rotation. The springs 22 and 24 are chosen such that the preload on O-ring seal 30 is maintained until the differential pressure across the seal would otherwise result in failure.

Before failure of the O-ring seal occurs, the differential pressure acting on EGI seal 16 forces the assembly forward compressing springs 22 and 24 until sleeve 20 encounters collar 48. This condition is shown in FIG. 2. At high pressure differentials, the dynamic seal function is now maintained by carbon insert 18 rotating against polished surface 26 of EGI seal 16. The pressure can now increase beyond all elastomeric seal limitations of O-ring seal 30 because the carbon face seal can maintain a seal under extreme load conditions.

The axial thrust load created by the differential pressure acting on EGI seal 16 and through sleeve 20, collar 48, and bearing 52 is taken up by housing 12. When, and if, the pressure differential across carbon insert 18 reduces to the point that springs 20 and 22 push EGI seal 16 away from collar 48 to encounter shaft 10, then O-ring seal 30 will again provide a low pressure seal against shaft surface 28.

Figure 3:
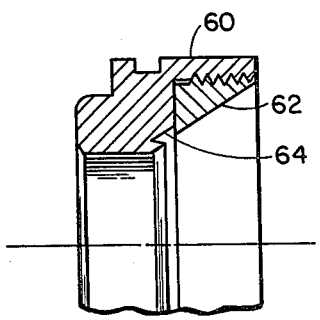
FIG. 3 shows a cross-sectional view illustrating a manner of manufacturing the holder of the O-ring for the dynamic low pressure differential seal.

FIG. 3 shows a method wherein EGI seal 16 can be configured in two parts to ease in the manufacturing of a dovetail groove 64 for O-ring seal 30 shown in FIG. 1. The EGI seal is shown configured in two components, the first being a main body 60 of an EGI seal and a second screw-in ring 62 which is designed to complete dovetail groove 64 for the O-ring seal. By this method, manufacture of the EGI seal is made simpler and faster without requiring the use of difficult machining techniques for producing the dovetail groove.

Figure 4:
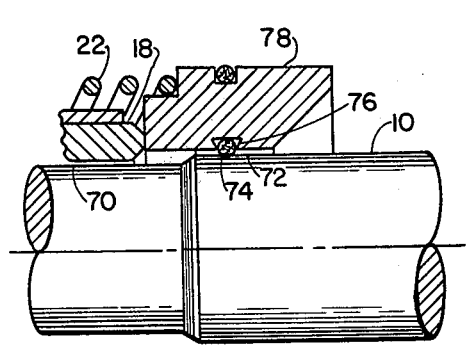
FIG. 4 depicts an alternative method for constructing the low pressure O-ring seal method.
Figure 5:
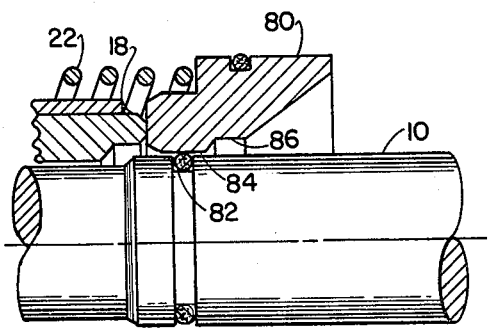
FIG. 5 is a second alternative depiction of a method of making the low pressure seal.
Figure 6:
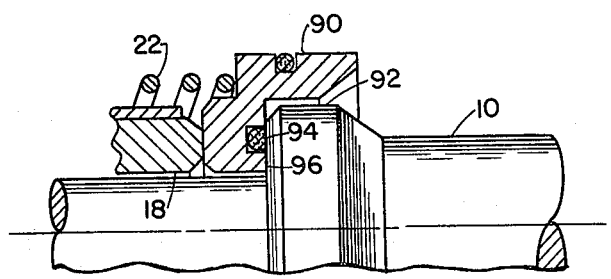
FIG. 6 presents a third alternative method for accomplishing the low pressure O-ring seal.

Other alternatives for the dynamic O-ring seal to shaft 10 are presented in FIGS. 4, 5, and 6. FIG. 4 shows EGI seal 78 configured so that the dynamic O-ring seal 74 occurs against a surface of shaft 10 which is parallel to the shaft's axis. In this configuration, dovetail groove 76 is machined into the EGI seal parallel with the axis of rotation. Also shown is spring 22 and carbon insert 18.

A principal feature of the operation of the dynamic O-ring seal is the ability to reduce wear by disengaging the O-ring seal from contact with shaft 10 during periods when high pressure differentials are being sealed against by the face type seal of the carbon insert 18 and EGI seal 78 (EGI seal in FIGS. 1 and 2 are noted as item 16). Shaft 10, in this configuration, is constructed with two surfaces 70 and 72. When the dynamic O-ring seal is aligned with surface 72, sealing contact is made to avert low pressure leakage. However, when a high pressure differential causes EGI seal 78 to shift to the left in the drawing, the dynamic O-ring seal 74 will shift left into alignment with shaft surface 70 which has a smaller diameter than surface 72. The smaller diameter of surface 70 is such as to allow O-ring 74 to float without coming in contact or wearing during high pressure periods of sealing.

In FIG. 5, the dynamic O-ring seal is placed in a groove machined in shaft 10. During low pressure sealing periods O-ring seal 82 is aligned with a surface 84 on EGI seal 80. When high pressure differentials force EGI seal 80 to move to the left, O-ring seal 82 becomes aligned with a surface 86. Surface 86 is constructed with a larger diameter to allow dynamic O-ring 82 to float out of contact with EGI seal 80 thereby relieving any wear.

In FIG. 6 shaft 10 has been machined to contain a shoulder 92 with a face 96 perpendicular to its axis. The dynamic O-ring is contained in a groove machined in EGI seal 90 in a manner that the O-ring seal 94 will occur against face 96 on shaft 10. When higher pressure differentials cause compression of springs 22 and 24, and the movement of EGI seal 90 to the left, O-ring seal 94 moves away from shaft surface 96 thereby relieving wear on the O-ring.

Figure 7:
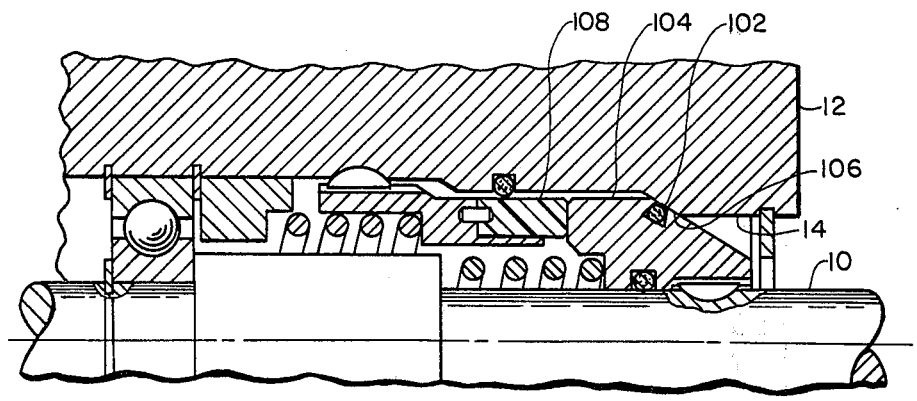
FIG. 7 shows a cutaway section showing the shaft in the aperture with the face seal and O-ring seal combination reversed wherein the dynamic O-ring seals against a surface on the aperture.

Other embodiments and geometries for placing the dynamic O-ring seal are obvious. In particular, the dynamic O-ring seal may be constructed to occur between a rotating sleeve keyed to the rotating shaft and the surface of the aperture. In this type embodiment the dynamic O-ring could be held in a dovetail groove constructed either in the surface of the aperture or in the sleeve. FIG. 7 shows a form of this embodiment with a dynamic O-ring seal 102 acting against a surface 106 of aperture 14, and where the O-ring is seated in an EGI seal 104. It is to be noted that FIG. 7 represents the same functions shown in FIGS. 1 and 2 but with the roles of each sleeve and seal components reversed in regards to relationships between the shaft and the aperture. Consequently, and considering the same role reversal requirements, the alternatives shown in FIGS. 3 through 6 also apply to the embodiment shown in FIG. 7.

Figure 8:
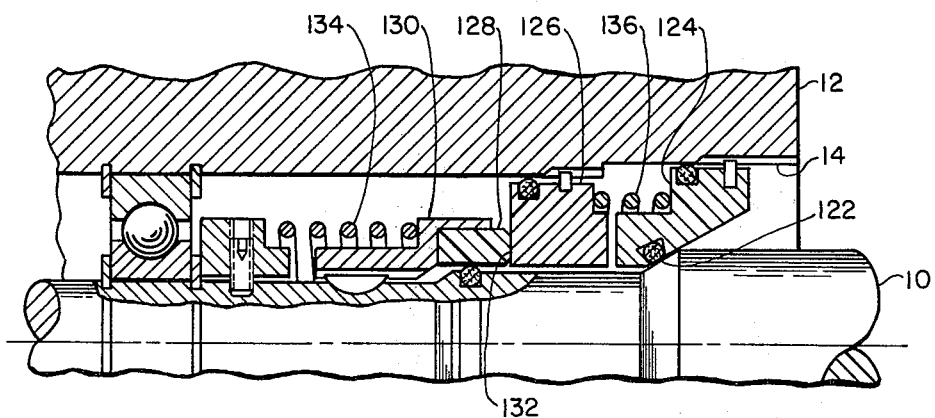
FIG. 8 shows a sectional view depicting an alternative where a sleeve separate from the face seal combination sleeves holds the dynamic O-ring seal.

FIG. 8 shows an alternative embodiment wherein a dynamic O-ring seal 122 is housed in a sleeve 124 that is separate from a sleeve 126. Sleeve 126 contains a mating polished surface 132 for making the high pressure face seal with a carbon insert 128. Springs 134 and 136 provide the force necessary to engage the dynamic O-ring seal during periods of low pressure differential. Similarly as shown in FIGS. 1 and 2, the carbon insert and its holding sleeve rotate with shaft 10 while sleeves 124 and 126 are keyed to aperture 14.

A further interchange which is equivantly obvious is the interchange in any of these embodiments of the role and location of the carbon insert with its mating polished sealing surface on the EGI seal sleeves. For example, in FIGS. 1 and 2 it is equivalent to locate carbon insert 18 in EGI seal 16 while concurrently locating a polished surface for making a mating seal with insert 18 on sleeve 20.

Obviously, many other modifications and variations of the present invention are possible in the light of the above teachings. It is therefore to be understood that within the scope of the appended claims the invention may be practiced otherwise than as specifically described.

What is claimed is:

1. A shaft seal combination wherein a rotating shaft mounted in an aperture through a wall with a pressure differential existing between its inner and outer surfaces is dynamically sealed against low and high pressure leakage, said shaft seal comprising:

a face-type rotary mechanical seal assembly fitted between the shaft surface and the aperture surface, said assembly having:
  a first sleeve keyed nonrotatably to the aperture in a manner that the sleeve can slide back and forth along the shaft's axis; and
  a second sleeve keyed to rotate with the shaft in a manner that said second sleeve can slide back and forth along the shaft's axis, wherein the first and second sleeves contain matching face-type seal surfaces which make sealable contact during the existence of high pressure differentials between the inner and outer surfaces of the wall;
an O-ring;
means for holding the O-ring, said means fitted not to rotate with the shaft but to slide back and forth axially in a manner that the O-ring is brought into sealable contact with the surface of the rotating shaft during periods of low pressure differential between the inner and outer surfaces of the wall; and
means for forcing the holding means and O-ring against the surface of the shaft during periods of low pressure differential between the inner and outer surfaces of the wall.

2. An apparatus according to claim 1 further comprising:
  a sloped circumferential surface on a portion of the shaft designed to receive and seal with the O-ring in the holding means during periods of low pressure differential, said sloped surface allowing the O-ring to retract from unnecessary contact when the face-type rotary mechanical seal assembly is creating the seal during periods of high pressure differentials; and
  the holding means shaped to hold the O-ring in a manner that the O-ring mates in a sealing way when the holding means slides the O-ring into contact with the sloped circumferential surface on the shaft.

3. An apparatus according to claim 2 wherein the means for holding the O-ring is built into the first sleeve of the face-type rotary seal assembly.

4. An apparatus according to claim 1 further comprising:
  two coaxial circumferential surfaces of different diameters on the shaft where the O-ring can be axially slide between them in a manner that the O-ring makes sealable contact with the first and larger diameter circumferential surface during periods of low pressure differentials, and is slide to match with the second and smaller diameter circumferential surface otherwise, said smaller diameter circumferential surface being of a diameter less than the inner diameter of the O-ring; and
  the holding means shaped to hold the O-ring in a manner that said O-ring mates sealably with the first circumferential surface of the shaft when slid in alignment with said first surface, and in a manner that said O-ring will not make contact with the second circumferential surface when slid in alignment with said second surface.

5. An apparatus according to claim 4 wherein the means for holding the O-ring is built into the first sleeve of the face-type rotary seal assembly.

6. An apparatus according to claim 1 further comprising:
  a flat, annular surface on the shaft formed perpendicular to the axis of the shaft; and
  the holding means shaped to hold the O-ring perpendicular to the axis of the shaft in a manner that the O-ring is slidably pressed against the shaft's annular surface during periods of low pressure differentials, and is slid axially to be out of contact during other times.

7. An apparatus according to claim 6 wherein the means for holding the O-ring is built into the first sleeve of the face-type rotary seal assembly.

8. A shaft seal combination wherein a rotating shaft mounted in an aperture through a wall with a pressure differential axisting between its inner and outer surfaces is dynamically sealed against low and high pressure leakage, said shaft seal comprising:
  a face-type rotary mechanical seal assembly fitted between the shaft surface and the aperture surface, said assembly having:
    a first sleeve keyed nonrotatably to the aperture in a manner that the sleeve can slide back and forth along the shaft's axis; and
    a second sleeve keyed to rotate with the shaft in a manner that said second sleeve can slide back and forth along the shaft's axis, wherein the first and second sleeves contain matching face-type seal surfaces which make sealable contact during the existence of high pressure differentials between the inner and outer surfaces of the wall;
  an O-ring;
  means for holding the O-ring, said means fitted to rotate with the shaft and to slide back and forth along the shaft's axis in a manner that the O-ring is brought into sealable contact with a surface fixed in relation to the aperture during periods of low pressure differential between the inner and outer surfaces of the wall; and
  means for forcing the holding means and O-ring against the surface fixed in relation to the aperture during periods of low pressure differential.

9. An apparatus according to claim 8 further comprising:
  a sloped circumferential surface on a portion of the surface of the aperture designed to receive and seal with the O-ring in the holding means during periods of low pressure differential, said sloped surface allowing the O-ring to retract from unnecessary contact when the face-type rotary mechanical seal assembly is creating the seal during periods of high pressure differentials; and
  the holding means shaped to hold the O-ring in a manner that the O-ring mates in a sealing way when the holding means slides the O-ring into contact with the sloped circumferential surface on the surface of the aperture.

10. An apparatus according to claim 9 wherein the means for holding the O-ring is built into the first sleeve of the face-type rotary seal assembly.

11. An apparatus according to claim 8 further comprising:
  two coaxial circumferential surfaces of different diameters on the aperture where the O-ring can be axially slid between them in a manner that the O-ring makes sealable contact with the first lesser diameter circumferential surface during periods of low pressure differentials, and is slid to align with the second and larger diameter circumferential surface otherwise, said larger diameter circumferential surface of a diameter more than the outer diameter of the O-ring; and the holding means shaped to hold the O-ring in a manner that said O-ring mates sealably with the first circumferential surface in the aperture when slid into alignment with said first surface, and in a manner that said O-ring will not make contact with the second circumferential surface when slid into alignment with said second surface.

12. An apparatus according to claim 11 wherein the means for holding the O-ring is built into the second sleeve of the face-type rotary seal assembly.

13. An apparatus according to claim 8 further comprising:

a flat, annular surface in the aperture formed perpendicular to the axis of the aperture and shaft; and the holding means shaped to hold the O-ring perpendicular to the axis of the aperture and shaft in a manner that the O-ring is slidably pressed against the aperture's annular surface during periods of low pressure differentials, and is slid axially to be out of contact during other times.

14. An apparatus according to claim 13 wherein the means for holding the O-ring is built into the second sleeve of the face-type rotary seal assembly.

15. A sealing apparatus for a shaft rotatably mounted in a housing wherein a low to high pressure differential occurs across the housing on opposite sides of the shaft, said sealing apparatus comprising:

first sleeve means mounted about the shaft for longitudinal motion therealong and having an O-ring for dynamic sealing engagement with the shaft when the first sleeve means is in a first longitudinal position and for breaking sealing engagement of the O-ring with the shaft when the first sleeve means is in a second longitudinal position;

means spring biasing the first sleeve means toward the first longitudinal position so that the O-ring dynamically seals the shaft during a low pressure differential condition;

second sleeve means mounted about the shaft for longitudinal motion therealong;

the first and second sleeve means each having faces for sealing engagement with one another; and means spring biasing the second sleeve means toward the first sleeve means for tight sealing engagement of their sealing faces during a high pressure differential condition.

16. A sealing apparatus as claimed in claim 15 including:

the face of one of the sleeve means being carbon.

17. A sealing apparatus as claimed in claim 15 including:

means for stopping longitudinal movement of the second sleeve means away from the first sleeve means.

18. A sealing apparatus as claimed on claim 15 including:

means for stopping longitudinal movement of the first sleeve means away from the second sleeve means.

* * * * *